July 12, 1938.  C. B. DE VLIEG  2,123,825
COMBINATION POSITIONING AND LOCKING MECHANISM
Original Filed March 7, 1934   5 Sheets-Sheet 1
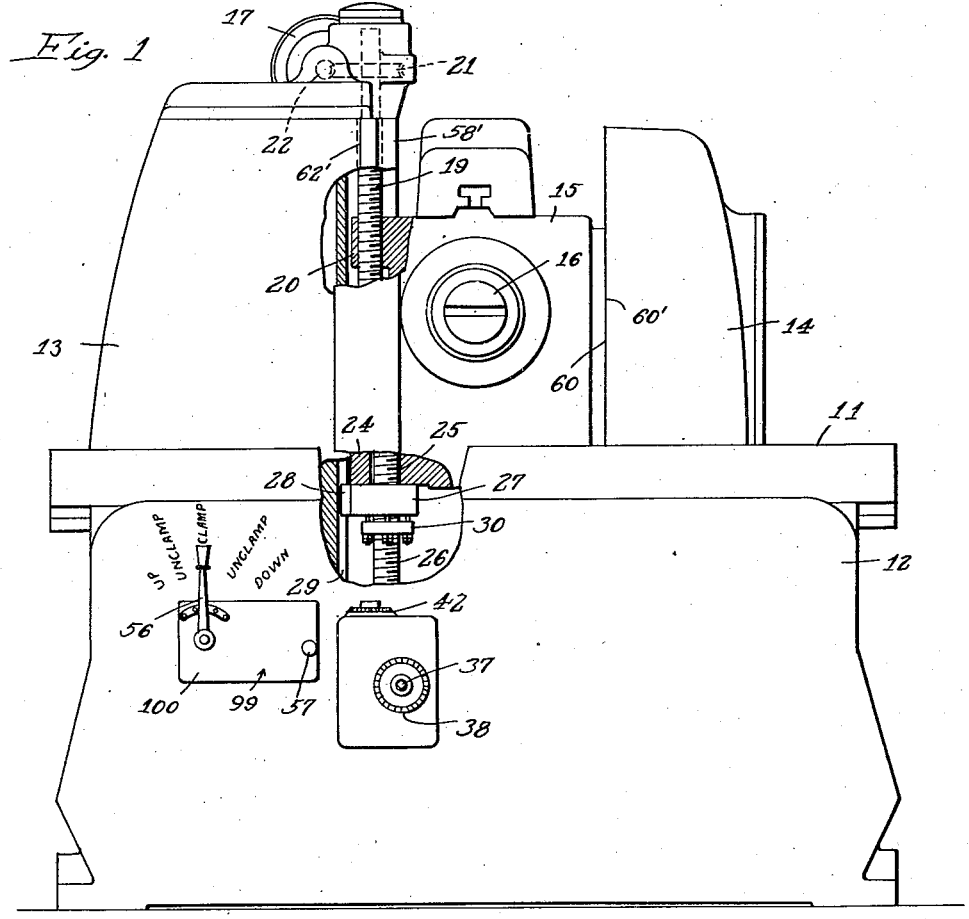
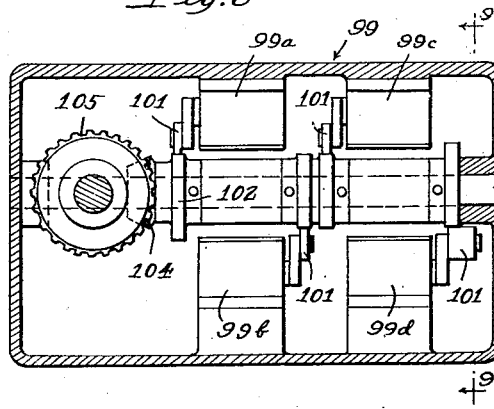
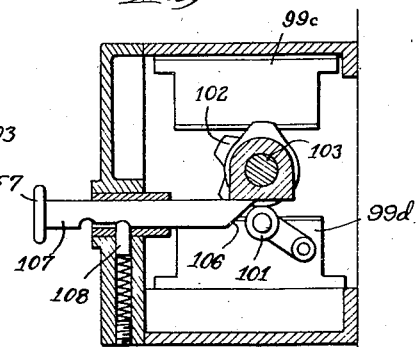

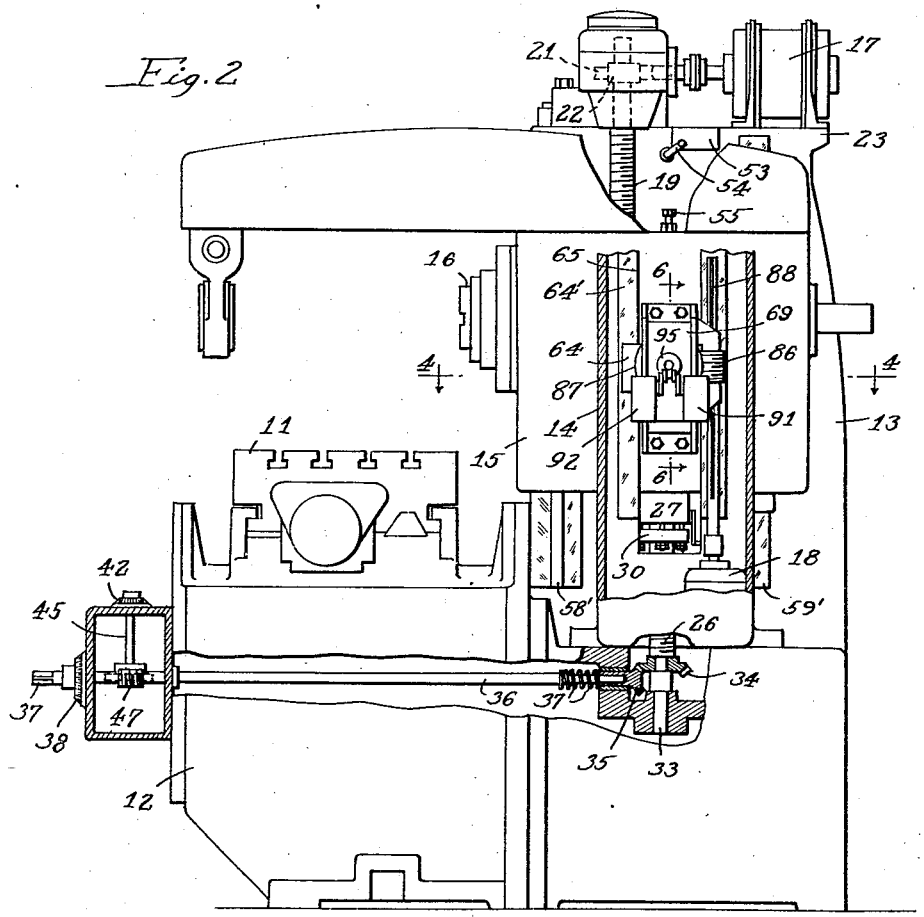
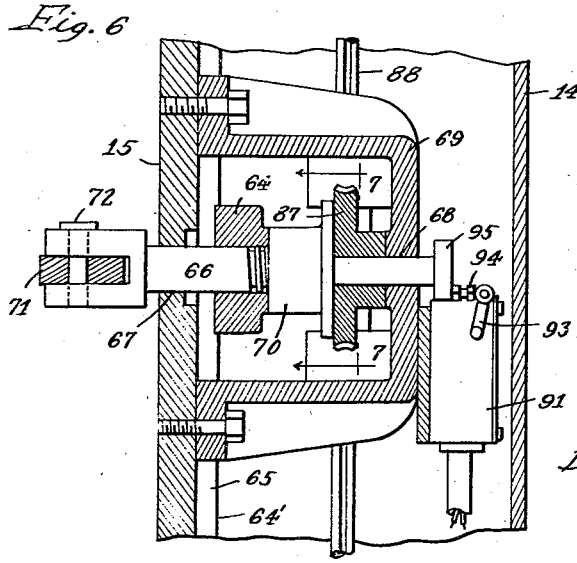
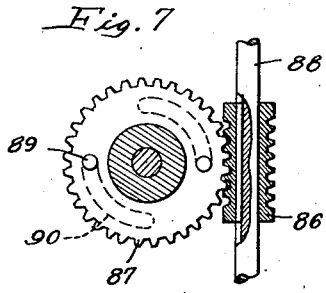

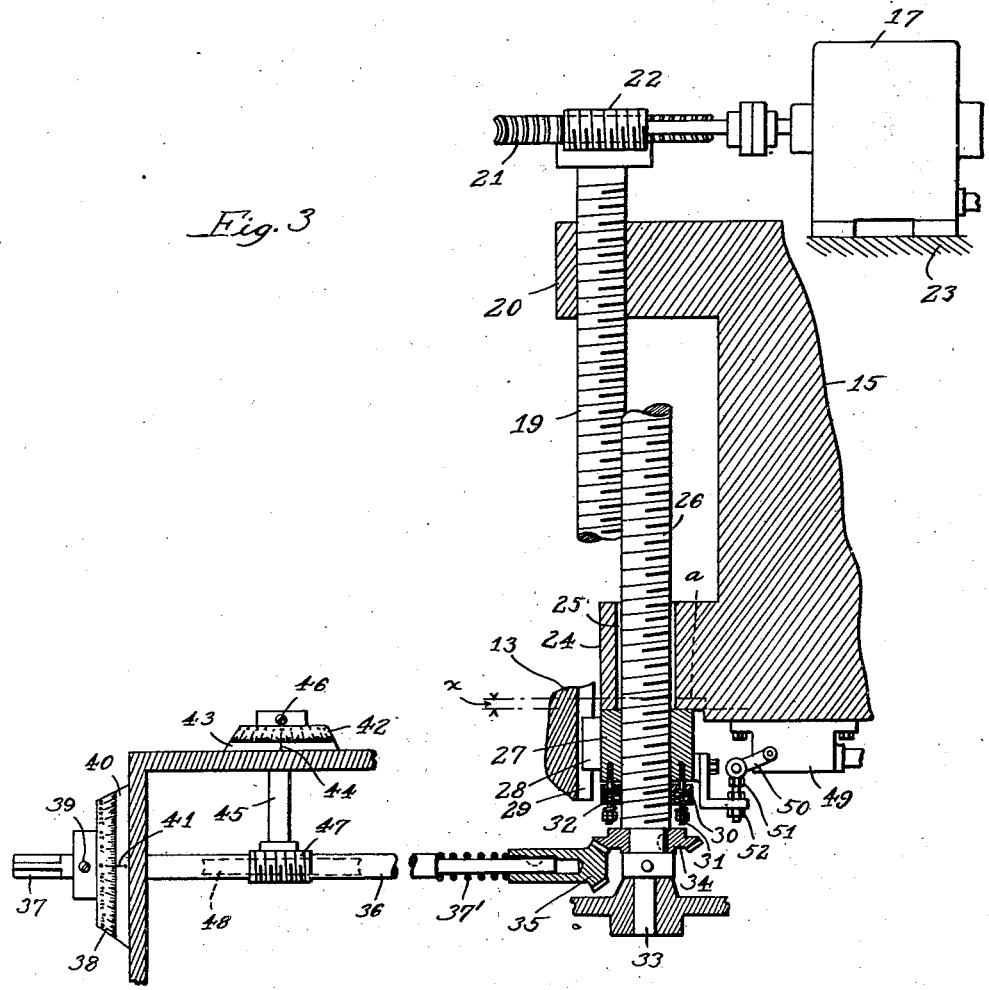

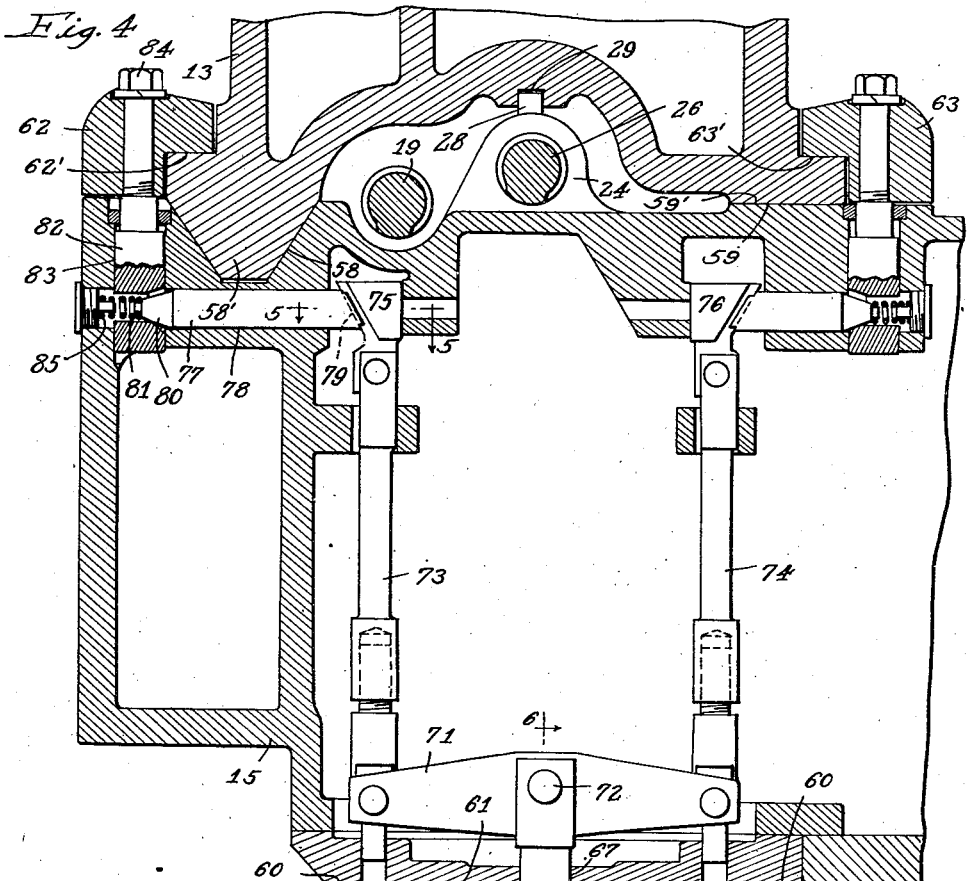

July 12, 1938.  C. B. DE VLIEG  2,123,825
COMBINATION POSITIONING AND LOCKING MECHANISM
Original Filed March 7, 1934  5 Sheets-Sheet 5

Patented July 12, 1938

2,123,825

UNITED STATES PATENT OFFICE 2,123,825

COMBINATION POSITIONING AND LOCKING MECHANISM

Charles B. De Vlieg, Jackson, Mich., assignor to Associated Patents, Inc., Cincinnati, Ohio, a corporation of Ohio Application March 7, 1934, Serial No. 714,378
Renewed May 2, 1935

46 Claims. (Cl. 90—16)

This invention relates to automatic positioning and locking mechanisms generally, and has particular reference to one adapted for precision location and locking of any machine tool carriage or slide, for metal working or wood working, although the principal uses are in metal working. It is further immaterial whether the carriage or slide to be positioned is a work carriage or a tool carriage, for obvious reasons. Among the kinds of machines finding use for automatic positioning and locking mechanisms like the one of my invention may be mentioned milling machines, drilling machines, lathes, boring and tapping machines, planers and shapers, etc.

One of the principal objects of the present invention is to provide a motor driven locking mechanism to securely clamp the movable carriage or slide by balanced binding of gibs at two or three points. In accordance with the invention, the motor is permitted to exert its full torque in the turning of a clamping screw in a nut in the clamping direction, by actually stalling, whereby to insure tightest possible locking. The circuit for the stalled motor is arranged to be broken by a time overload switch. However, a certain amount of lost motion is provided for in the other direction so that the motor will be free to get a start and have sufficient torque for unlocking.

Another principal object of this invention is to provide a locking mechanism of the kind mentioned coordinated with a motor driven automatic positioning mechanism in such a way that a hand lever may be employed for positioning and locking, movable to five different positions, namely, from a central locking position in either direction first to an unlocking position and then another position for up or down movement, upward movement being secured on one side of center and downward movement on the other side. In accordance with the invention, means is also provided for securing the up and down movement without passing through the locking stage, the means being operable by simply depressing a button adjacent the movable hand lever. Furthermore, in accordance with this invention, automatic electrical controls are provided to coordinate the positioning and locking mechanisms so that the clamp motor continues to operate until the carriage is fully unlocked, and the elevator motor is not started until the carriage is entirely free to move up or down. This application is a continuation in part of my application on Automatic positioning mechanism, Serial No. 647,663, filed December 16, 1932.

The invention will be better understood as reference is made in the following description to the accompanying drawings, wherein—

Figure 1 is a front view of a horizontal milling machine embodying my invention, showing certain parts broken away to disclose portions of the automatic positioning mechanism;

Fig. 2 is an end view of the machine showing portions broken away to better illustrate the positioning and locking mechanisms;

Fig. 3 is a schematic drawing of the automatic positioning mechanism;

Fig. 4 is a horizontal section on the line 4—4 of Fig. 2 showing the automatic locking mechanism;

Fig. 5 is a sectional detail on the line 5—5 of Fig. 4;

Fig. 6 is a vertical section through a portion of the locking mechanism taken on the line 6—6 of Figs. 2 and 4;

Fig. 7 is a sectional detail on the line 7—7 of Fig. 6;

Fig. 8 is an enlarged sectional view of the control box appearing in Figure 1, showing the operation of limit switches by the control lever;

Fig. 9 is a section on the line 9—9 of Fig. 8 to show the push button for holding one of said switches, the locking switch, open circuited.

The same reference numerals are applied to corresponding parts throughout the views.

Figure 10:
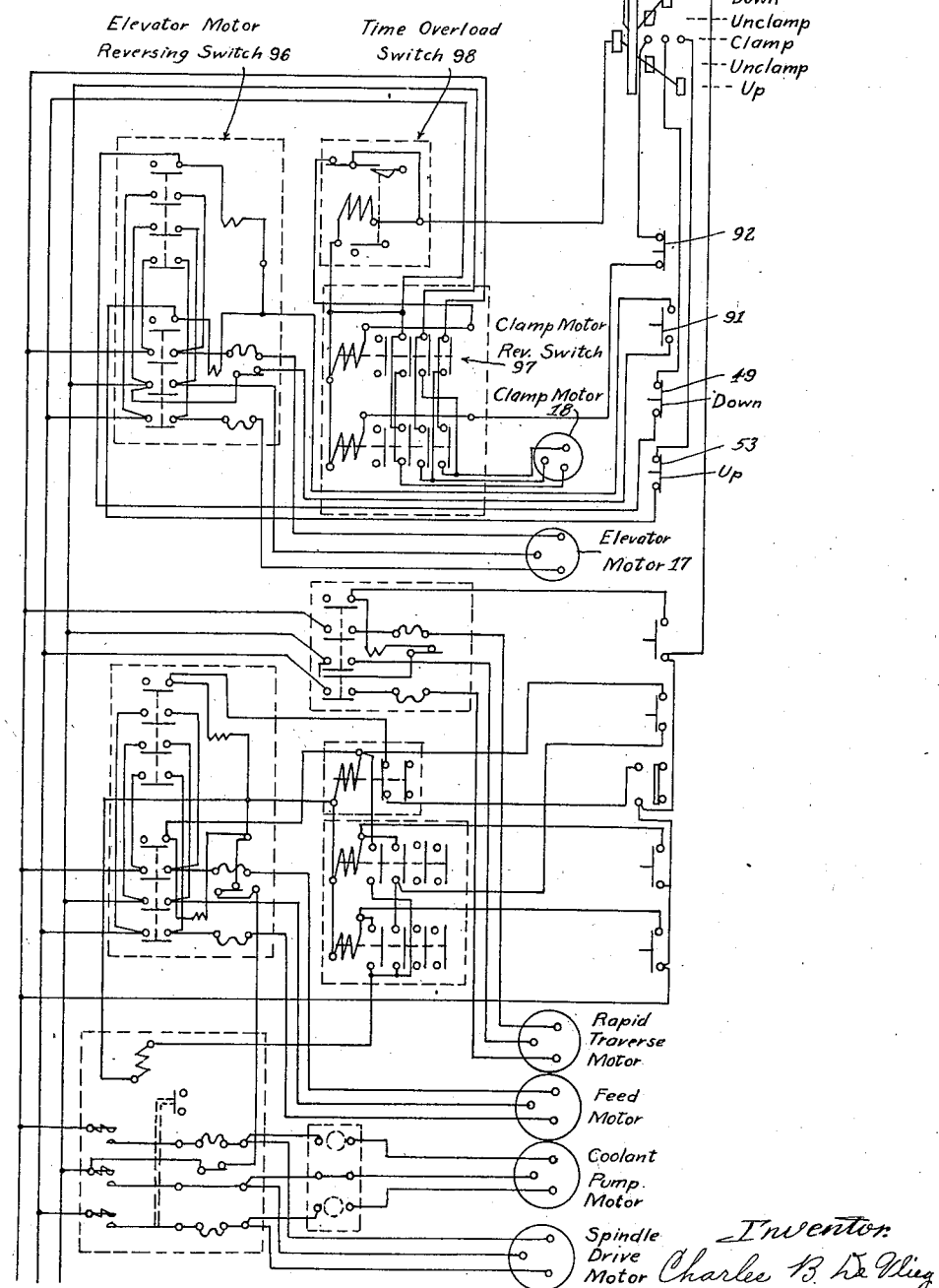
Fig. 10 is a complete wiring diagram for the machine.

Referring particularly to Figs. 1 and 2, I have illustrated my invention as embodied in a horizontal milling machine having a table 11 operating on a slide on the bed 12. A main column 13 and a second column 14 are at the back of the machine, and a spindle head 15, which in this machine is the movable carriage or slide, previously referred to, is slidably mounted between the double column structure to provide vertical adjustment for a horizontal spindle, which in turn has provision for cross adjustment with the quill appearing at 16. The positioning of the head for a desired distance between the center of the spindle and the top of the table 11 is accomplished automatically with power, and the locking of the head likewise, in accordance with my invention, as hereinafter fully described. The positioning mechanism depends upon the electric motor 17 for power, and the electric motor 18 furnishes the power for the locking mechanism. Both motors are of any suitable reversible type. The motor 17 for purposes of convenience will hereinafter be referred to as the elevator motor, since it is used for both up and down movement, and the motor 18 will be referred to as the clamp motor.

*Automatic positioning mechanism*

This mechanism will be easily understood by reference to Figs. 1, 2 and 3. 19 is the propelling screw threading in a boss 20 on the sliding head 15, the same being suitably supported against endwise movement so as to transmit vertical movement to the head when the screw is turned. A worm gear 21 on the upper end of the screw has a worm 22 meshing with it and driven by the elevator motor 17 through a suitable coupling. The motor 17 is carried on a support 23 on the column 13. Another boss 24 is provided on the head 15 which has an opening 25 therein to freely receive a screw 26 for adjusting a positive stop 27. The latter is simply in the form of a nut threaded on the screw and held against turning by means of a tongue 28 slidable in a vertical groove 29 provided in the column 13. A secondary nut 30 threaded on the screw 26 below the stop 27 has a plurality of cap screws 31 passed through holes therein and threaded in the stop 27, and coiled compression springs 32 are compressed between the heads of these screws and the nut 30 as a means of removing back lash from the stop 27, for purposes of accuracy in setting. The screw 26 has a reduced shank 33 at the lower end thereof for bearing and end thrust support on the frame of the machine as shown. There is, of course, another bearing at the other end of the screw to hold the same against endwise movement, for obvious reasons. A bevel gear 34 keyed on the screw at the lower end has a bevel pinion 35 meshed with it and arranged to be turned by means of a shaft 36, rotated manually, as will be brought out presently. The pinion 35 is splined on the end of the shaft 36 and a coiled compression spring 37' acts between an annular shoulder on the shaft and the end of the hub of the pinion 35 for the purpose of removing back lash in the gear connection between the shaft 36 and screw 26. Now, the shaft 36 has a square shank 37 projecting from the frame of the machine to permit application of a hand crank thereto for manually rotating the shaft and the screw 26 with it, so as to adjust the stop 27. A dial 38 fixed on the projecting end of the shaft as by means of a set screw 39 turns relative to the plate 40 fixed on the frame. An index mark 41 on the plate permits one to make a reading on the dial to show the extent of adjustment. The pitch of the screw 26 and the ratio of the gears 34—35 are such that one turn of the shaft 36 is equivalent to .250 inch adjustment of the stop 27. It is obvious, therefore, that in order that the operator may have a direct reading in inches and fractions thereof down to .001 inch, it is necessary that a second dial be provided as that shown at 42, the dial 42 for a reading of inches and the dial 38 for fractions. The dial 42 turns with respect to the plate 43 on which the index mark 44 is provided. A shaft 45 has the dial 42 suitably fixed thereto by means of a set screw 46. The shaft 45 is turned by the meshing of a worm 47 on the shaft 36 with a worm gear 48 fixed on the shaft 45. The reduction afforded at 47—48 is 4 to 1, so that four turns of the shaft 36 are equivalent to one turn of the shaft 45, thus maintaining the proper relationship between the dials 38 and 42.

A limit switch 49 controlling the circuit for the elevator motor 17 is constructed so that when the movable arm 50 thereof is swung in a clockwise direction by engagement with the abutment 51 in the downward movement of the head 15, the circuit for the motor 17 will be opened. Attention is called to the dotted line position *a* of the head 15 shown in Fig. 3, slightly above the full line position. The distance *x* between the dotted and full line positions is the amount of movement of the head 15 resulting from overrun of the motor 17, from the moment the circuit therefor is broken by the limit switch arm 50 coming in contact with and being moved by the abutment 51. There is a sufficient allowance in this distance so that all of the overrun is not required merely to bring the head 15 down so that it touches the stop 27, but a portion of the momentum will be spent in binding the propelling screw 19 in the boss 20. The abutment 51 on the stop 27 is in the form of a set screw arranged to be adjusted in accordance with the overrun of the motor, and lock nuts 52 are provided to fasten the screw in adjusted position. Obviously, if the motor has little overrun, the screw 51 should be lowered so as to allow for a smaller dimension at *x*, and vice versa. A similar switch 53 may be provided, as shown in Fig. 2, for limiting upward movement, namely, as a safety stop for preventing the head from going up beyond its proper limit. The movable arm 54 in this instance cooperates with a screw 55 on the head.

In operation, assuming that the operator desires to position the head 15 accurately a certain distance below the present position, he, first of all, makes a note of the reading of the dials 38 and 42 so as to permit him to reset the stop 27 accurately in the new position. He can, of course, reset the dials to zero before turning the shaft 36 so as to permit him to read directly on the dials the distance to which the stop 27 is adjusted. Having set the stop the exact distance away from its former position in accordance with the new position desired for the head, the operator then grasps the control handle 56 shown in Figure 1 and moves it from the position marked "Clamp" to the right past the intermediate position marked "Unclamp" to the extreme position marked "Down" to cause the head 15 to be first unlocked, as will hereinafter appear, and then to be moved downwardly under the power of the elevator motor 17 and screw 19, until the limit switch 49 breaks the motor circuit. When that occurs, the overrun of the motor assures sufficient additional movement of the head under action of screw 19 to bring the head into firm engagement with the stop 27 for accurate positioning. As soon as the head is thusly re-positioned, it is locked in its new position by moving the control lever 56 back to the central position marked "Clamp", the locking being accomplished as hereinafter described.

Now, on the other hand, if the head 15 is to be set to a certain position above the present position, it is manifest that the order of operations is different. In that case, the operator must first back or raise the head 15 away from the stop 27, and this he does by moving the control lever 56 to the extreme left to the position marked "Up". It is in this operation that it is desirable to have the limit switch 53 to prevent movement of the head upwardly beyond a certain position. The operator having backed the head away from the stop can now reset the stop to a new position, a predetermined distance above the present one, in accordance with whatever elevation is desired for the head. With the stop accurately reset, the operator then presses the button 57 to prevent functioning of the clamp motor 18, as will presently appear, and moves the control lever 56 all the way to the other extreme position marked "Down", whereby to operate the elevator motor 17 in the reverse direction to lower the head 15 into engagement with the stop 27 in the same way as previously described, after which the lever 56 can be returned to the central "Clamp" position to lock the head. The button 57 will be pulled out again after it has been depressed to prevent operation of the clamp motor, so that the clamp motor will accomplish the power locking when the lever 56 is brought to the central position.

Automatic locking mechanism

This mechanism will be best understood by reference to Figs. 2 and 4–7. The head 15 has on one side a vertically extending V-groove 58 and a vertically extending flat surface 59 for sliding engagement with complemental ways 58' and 59' on the column 13. On its other side there are flat surfaces 60 and a tapered vertically extending boss 61 therebetween for engagement with complemental ways 60' and 61' on the second column 14. Two gibs 62 and 63 are provided for binding or clamping the head on the main column 13, and a third gib 64 is provided for binding or clamping the head on the second column 14. The gibs 62 and 63 are arranged to be drawn tightly into engagement with the surfaces 62' and 63' on column 13 behind the ways 58' and 59', and gib 64 is arranged to tightly engage flat surfaces 64' provided in the column 14 behind the surfaces 60' and 61'. The wall of the column 14 is slotted vertically as at 65 to permit extension into the column of the clamping screw 66 from the head 15 and allow the full range of up and down movement of the head relative to the column. The screw 66 is slidable in a hole 67 on the head, and in another hole 68 in a bracket 69 which projects from the head into the column through the slot 65. A nut 70 threading on the screw 66 is turned by power to draw the screw 66 toward the column 14 to bind the gibs 62 and 63, and cause the gib 64 to bind by the reaction of nut 70, which bears against this gib as shown. The binding of the gibs 62 and 63 is equalized by reason of the crosshead 71 which is pivoted at 72 on the end of the screw 66. The crosshead is connected at its opposite ends with rods 73 and 74 attached to cams 75 and 76, respectively. Plungers 77 slidable in holes 78 in the head 15 have inclined slotted ends 79 to receive the inclined projecting portions of the cams (see Fig. 5). In that way the plungers are forced outwardly when the nut 70 is drawn up on the screw 66, and the tapered ends 80 of these plungers exert a wedging action in the tapered holes 81 provided in other plungers 82 slidable in holes 83 in the head, whereby to draw up the gibs 62 and 63 by means of bolts 84 into tight engagement with the surfaces 62' and 63' on the column 13. It is obvious that there is not only equalized pressure as between gibs 62 and 63, but also balanced clamping on both columns 13 and 14, due to the fact that whatever pull is exerted on the screw 66 to tighten gibs 62 and 63 results in an equal and opposite force applied to the gib 64 by the nut 70. When the nut 70 is turned in the opposite direction to unlock or unclamp the head, springs 85 come into play to force the plungers 77 away from plungers 82 to the extent permitted by the backing away of cams 75 and 76, thus assuring immediate freeing of the head for sliding movement without perceptible drag. The nut 70 is turned by the clamp motor 18 through a worm and gear connection 86—87. The worm 86 is splined on the shaft 88 which is coupled to the armature shaft of the motor and extends upwardly in the column 14 far enough to have driving connection with the worm in all operative positions of the head 15. The worm gear 87 has two diametrically opposed pins 89 extending therefrom into arcuate slots 90 provided in a flange on the nut 70, whereby to provide a lost motion driving connection between the gear and nut. This type of connection is provided in order that after the clamp motor 18 has stalled in tightening the nut 70 to lock the head 15, the motor will be free to turn in the opposite direction sufficiently to have the necessary torque to loosen the nut in unlocking.

Coordination of positioning and locking mechanisms

Referring to Figs. 1, 4 and 8–10, attention is first called to the two limit switches 91 and 92 carried on the bracket 69, each having a swingable arm 93 engaged by an adjustable set screw 94 carried on a head 95 on the end of the screw 66, whereby to operate the switches in the endwise movement of the screw in the locking and unlocking of the head 15. The switch 91 is included in the circuit for the elevator motor 17 and is normally open, whereas the switch 92 is included in the circuit of the clamp motor 18 and is normally closed (see Fig. 10). Thus, in the unlocking of the head, when the screw 66 moves inwardly, the switch 91 is arranged to be closed substantially simultaneously with the opening of switch 92, so as to permit the elevator motor 17 to operate only when the head is entirely unlocked and free to move without perceptible drag. Once the elevator motor is set into operation, it is controlled by limit switches 49 and 53, the switch 49 opening the circuit at the limit of downward movement, and the switch 53 opening the circuit at the limit of upward movement.

Fig. 10 contains a disclosure of a reversing switch 96 for the elevator motor 17 and another reversing switch 97 for the clamp motor 18, whereby to provide for the reversal of motor 17 for up or down movement of the head 15, and the reversal of motor 18 for the locking or unlocking of the head. At 98 there is disclosed the time relay or overload switch required in connection with clamp motor 18 to permit stalling thereof in the locking of the head, as previously described.

A master switch, illustrated diagrammatically at 99 in Fig. 10, comprises four limit switches 99a—99d housed in a control box 100 and arranged to be operated in a predetermined sequence by movement of the control lever 56. All of these limit switches have rollers 101 carried on swingable arms as in the case of the limit switches 49 and 53. The rollers are operable by four cams 102 mounted on the shaft 103 suitably supported in bearings in the control box. The shaft 103 carries a bevel pinion 104 on one end thereof meshing with bevel gear 105 that is arranged to be turned by means of the control lever 56. Any suitable spring pressed detent may be provided on the lever 56 to releasably hold the lever in any one of the five positions indicated in Figure 1. When the lever 56 is in the central position marked "Clamp", the switch 99d is closed, whereby to complete a circuit through the clamp motor 18 as may be traced in Fig. 10, from the master switch 99, position "Clamp". When the lever 56 is in either one of the two positions marked "Unclamp" (Figure 1), the switch 99a is closed, whereby to operate the motor 18 in the reverse direction to unlock the head as may be traced in Fig. 10 from the master switch 99, position "Unclamp". When the lever 56 is moved to the extreme left to the position marked "Up" (Figure 1), switch 99c is closed, whereby to complete a circuit through the elevator motor 17 for upward movement of the head, as may also be traced in Fig. 10 from master switch 99, position "Up". When the lever 56 is moved to the extreme right to the position marked "Down" (Figure 1), switch 99b is closed, whereby to complete a circuit through the elevator motor 17 in the reverse direction for downward movement of the head, as may be traced in Fig. 10 from master switch 99, position "Down". In connection with the above, attention is called again to switch 98. This has a contactor at the left and contacts at the right. When the elevator motor 17 is used for moving the head up or down, the contactor on the left is closed. The moment the elevator motor stops, this contactor opens on the left and the contacts at the right close to complete the circuit for the clamp motor 18. When the clamp motor has locked the head and the motor has stalled, the time relay then holds the current on the clamping motor for about five seconds before automatically opening the circuit.

The button 57 previously referred to as being arranged to be depressed when it is desired to dispense with the locking or clamping of the head may be pressed in, so that the lever 56 can be moved from the right or left to the opposite side of center to reverse the operation of the motor 17 without throwing the motor 18 into and out of operation. This button 57 operates in connection with the switch 99d that controls locking. This switch is normally closed and is opened by its cam 102 in normal operation by movement of the lever 56, except when the button 57 is depressed, in which event the cam 106 provided on the inner end of the stem 107 of the button 57 engages the roller 101 of the switch 99d and depresses it enough to open the switch. A spring pressed detent 108 cooperates with the stem 107 to hold the button releasably in either of its "In" and "Out" positions.

It is believed the foregoing description conveys a good understanding of the objects and advantages of my invention. The appended claims have been drawn with a view to covering all legitimate modifications and adaptations.

I claim:

1. Automatic positioning and locking mechanism comprising, in combination with a movable machine tool member, relatively rotatable screw and nut elements for power locking of said member, a motor for driving the rotatable element in either direction, relatively rotatable screw and nut elements for power positioning of said member, a second motor for driving the rotatable element in either direction, an adjustable stop for said member determining positioning, a limit switch for opening the second motor's circuit at a predetermined point in the movement of said member determined by the setting of said stop, said switch having a movable operating arm and said arm being engaged by an abutment in the movement of one relative to the other incident to the movement of said member, and another limit switch controlling the starting of the second motor, said switch having a movable operating arm moved at a predetermined point in the unlocking movement of said first screw and nut elements.

2. Automatic positioning and locking mechanism comprising, in combination with a movable machine tool member, relatively rotatable screw and nut elements for power locking of said member, a motor for driving the rotatable element in either direction, relatively rotatable screw and nut elements for power positioning of said member, a second motor for driving the rotatable element in either direction, two switches controlling operation of the first motor in either direction for locking or unlocking, two other switches controlling operation of the second motor for movement of the machine tool member in a certain direction or return, and a single manually operable control movable so as to operate the four switches in a sequence, whereby to lock or unlock the machine tool member and move the same in one direction or the other as desired.

3. A mechanism as set forth in claim 2 wherein the two positions of the control for the movement of the machine tool member in one direction or the other are on opposite sides of an intermediate "locking" position, the mechanism including a manually operable element for holding the locking switch in open position, whereby to permit alternating the one directional and the other directional movements without going through the locking stage.

4. Automatic positioning and locking mechanism comprising, in combination with a movable machine tool member, relatively rotatable screw and nut elements for power locking of said member, a motor for driving the rotatable element in either direction, relatively rotatable screw and nut elements for power positioning of said member, a second motor for driving the rotatable element in either direction, plural electrical switch means controlling operation of said motors in either direction to lock or unlock with the first motor or secure movement of the machine tool member in a certain direction or return with the second motor, and a single manually operable control for said means movable from a position corresponding to movement of the machine tool member in one direction to a position corresponding to movement thereof in the opposite direction, or vice versa, through intermediate locking and unlocking positions, whereby to first unlock the machine tool member before positioning movement thereof and permit locking said member after such movement.

5. A mechanism as set forth in claim 4 including a manually operable element operatively associated with a portion of said electrical switch means to render the first motor inoperative for locking.

6. In an automatic positioning and locking mechanism, the combination of a movable machine tool element, a manually operable control lever movable selectively to either one of five positions, that is, from a central locking position in one direction to an extreme position for movement of the machine tool element in one direction and in the other direction to an extreme position for movement of the machine tool element in the opposite direction, and in either direction to an intermediate unlocking position, motor operable screw and nut means for power positioning of the machine tool element, a reversible motor therefor, motor operable screw and nut means for power locking of the machine tool element, a second reversible motor therefor, and electrical control means operated by the aforesaid lever in its five different positions whereby to operate the first motor in one direction in the first extreme position of the lever and in the reverse direction in the other extreme position of the lever, and whereby to operate the second motor in one direction in the locking position of the lever and in the reverse direction in either of the unlocking positions of the lever.

7. A mechanism as set forth in claim 6 including two limit switches having movable operating elements arranged to be moved in the operation of the second screw and nut means, the one switch being normally open and included in the electrical circuit of the first motor and the other being normally closed and included in the electrical circuit of the second motor, said switches in the unlocking operation being operable so that the circuit for the first motor is closed through the first switch when the unlocking is completed.

8. A mechanism as set forth in claim 6 including a manually operable element operatively associated with a portion of said electrical control means and arranged in one position to operate said portion so as to render the second motor inoperative for locking.

9. In a machine tool, the combination of a movable carriage, power operable positioning means for moving the carriage to a predetermined position, power operable locking means for locking the carriage in different selected positions, power means for operating the positioning and locking means, and means automatically controlling the application of power to said means so that the positioning means is operable only after complete unlocking operation of the locking means.

10. In a machine tool, the combination of a movable carriage, a screw and nut for positioning the carriage, a motor for causing relative rotation of the screw and nut, a second screw and nut for locking the carriage, a second reversible motor for causing relative rotation of said screw and nut, said second motor being arranged to stall at the limit of locking rotation and having an overload switch to open the circuit therefor after stalling, another normally closed switch arranged to open the circuit for the second motor at the end of unlocking rotation, said switch being dependent for opening upon a predetermined amount of relative movement of the second screw and nut, and a third switch for completing a circuit through the first motor, also dependent for its operation upon a predetermined amount of relative movement of the second screw and nut.

11. A structure as set forth in claim 10 wherein the second motor has connection with the second screw and nut through a rotatable gear arranged to turn with one of the screw and nut elements in either direction, the structure including means providing a lost motion driving connection between the gear and the element driven thereby, whereby to allow a certain amount of free turning of the second motor in the reverse direction toward unlocking after stalling.

12. In a machine tool, the combination of a movable carriage, a screw and nut for positioning the carriage, a motor for causing relative rotation of the screw and nut, a second screw and nut for locking the carriage, a second reversible motor for causing relative rotation of said screw and nut, a switch to open the circuit of the second motor when the carriage is locked, another normally closed switch arranged to open the circuit for the second motor at the end of unlocking rotation, said switch being dependent for opening upon a predetermined amount of relative movement of the second screw and nut, and a third switch for completing a circuit through the first motor, also dependent for its operation upon a predetermined amount of relative movement of the screw and nut.

13. A structure as set forth in claim 12 including a manually adjustable stop to predetermine the different positions of the carriage, and a fourth switch for automatically opening the circuit of the first motor when the carriage engages the stop.

14. A locking mechanism for a machine tool element comprising one or more clamping members, a screw and nut for applying pressure on the clamping members, a reversible motor for causing relative rotation of the screw and nut, said motor being arranged to stall in the locking direction of rotation to lock the machine tool element with maximum pressure on the clamping members, an overload switch to open the motor circuit after the machine tool element is locked, and another switch normally closed during the unlocking rotation of said motor but opened by a predetermined amount of relative movement between the screw and nut, whereby to open the motor circuit when the machine tool element is unlocked.

15. A mechanism as set forth in claim 14, wherein the motor has connection with the screw and nut through a rotatable gear arranged to turn with one of the screw and nut elements in either direction, the structure including means providing a lost motion driving connection between the gear and the element driven thereby, whereby to allow a certain amount of free turning of the motor in the reverse direction toward unlocking after stalling.

16. In a machine tool, the combination of a first support, a second support spaced therefrom, a movable carriage therebetween slidable on ways on the supports, a pair of clamping gibs for locking the carriage to the one support, a third gib for locking the carriage on the other support, two pull rods for communicating clamping pressure to the first mentioned gibs and disposed in laterally spaced relation, a screw disposed therebetween and extending through the third gib and having a nut threading thereon to exert clamping pressure on the latter gib, a crosshead fulcrumed intermediate its ends on the screw and operatively connected at its opposite ends with the pull rods whereby to apply balanced clamping pressure to the first mentioned gibs and equal clamping pressure to the gibs on both supports, and means for causing relative rotation between the screw and nut.

17. In a machine tool, the combination of a first support, a second support spaced therefrom, a movable carriage therebetween slidable on ways on the supports, gib means for clamping the carriage on the first support, other gib means for clamping the carriage on the second support, a screw extending through the second gib means and arranged to exert a pull on the first gib means, a nut threading on the screw to exert a thrust on the second gib means, whereby to balance the clamping action between the two supports, and means for causing relative rotation between the screw and nut.

18. In a machine tool, a housing having ways thereon, a carriage slidable on the ways to different positions, a screw extending from the carriage into said housing, a gib for clamping the carriage to the housing having the screw extending therethrough, a nut threading on the screw and arranged to bear against the gib to exert clamping pressure thereon, a worm gear rotatable freely relative to the screw and having a lost motion driving connection with the nut, a worm meshed with the worm gear, and a reversible motor for driving the worm.

19. In a machine tool, a housing having ways thereon, a carriage slidable on the ways to different positions, a screw extending from the carriage into said housing, a bracket extending from the carriage into the housing having a bearing thereon receiving a smooth portion of the screw, a nut threading on the screw and arranged to exert a clamping pressure on a wall of the housing to lock the carriage frictionally in adjusted position, a worm gear having a lost motion driving connection with the nut, a worm meshed with the worm gear and supported against endwise movement on said bracket, a shaft extending lengthwise in said housing and having the worm splined thereon for a sliding driving connection therewith, and a motor stationarily supported in said housing and having a driving connection with one end of said shaft.

20. Automatic positioning and locking mechanism comprising, in combination with a movable machine tool member, means for power locking and means for power positioning of said member, separate motor means for operating the same, an adjustable stop for said member determining the extent of positioning movement thereof, and means operable automatically by said member in the arrival of said member at said stop for coincidentally commencing the locking of the member when the positioning movement thereof is discontinued.

21. In a machine tool, the combination of a movable carriage, power operable positioning means for moving the carriage, power operable means for locking the carriage in different selected positions, power means for operating the positioning and locking means, means automatically operable in the movement of the carriage for controlling the application of power to said power means so that the locking means is operable only after completion of the positioning operation of the positioning means, a hand control member movable in either direction to select the direction of positioning movement of said carriage, and means automatically operable in the movement of said member controlling the application of power to said power means so that the positioning means is operable only after unlocking operation of the locking means.

22. Automatic positioning and locking mechanism comprising, in combination with a movable machine tool member, means for power positioning and means for power locking of said member, a positioning motor, a locking motor, separate switches controlling the operation of said motors, and a single manually operable control movable so as to operate the switches in order, whereby to first move the machine tool member and then lock the same or to first unlock the machine tool member and then move the same.

23. A mechanism as set forth in claim 22, wherein the switches include a switch for movement in one direction, another switch for reverse movement and other switches for locking or unlocking, the said switches being so arranged with respect to the movement of the manually operable control so that the back and forth positions of the control are on opposite sides of an intermediate "locking" position.

24. A mechanism as set forth in claim 22, wherein the switches include a switch for movement in one direction, another switch for reverse movement and other switches for locking or unlocking, the said switches being so arranged with respect to the movement of the manually operable control so that the back and forth positions of the control are on opposite sides of an intermediate "locking" position, the mechanism including a manually operable element controlling the locking switch means, whereby to prevent locking and thus permit alternating the back and forth movements without going through the locking stage.

25. Automatic positioning and locking mechanism comprising, in combination with a movable machine tool member, means for power positioning and means for power locking of said member, motor means for driving the same in either direction, plural switch means controlling operation of the motor means to lock or unlock the machine tool member or secure movement thereof in either direction, and a single manually operable control for said switch means movable through intermediate locking and unlocking positions from other positions identified with movement of the machine tool member in opposite directions, whereby to first unlock the machine tool member before movement thereof and permit locking said member after such movement.

26. A mechanism as set forth in claim 25, including a manually operable element operatively associated with a portion of said switch means to prevent locking of the machine tool member.

27. In an automatic positioning and locking mechanism, the combination of a movable machine tool element, a manually operable control lever movable selectively to either one of five positions, that is, from a central locking position in one direction to an extreme position for movement of the machine tool element in one direction, and in the other direction to an extreme position for movement of the machine tool element in the opposite direction, and in either direction to an intermediate unlocking position, means for power positioning and means for power locking of the machine tool element, motor means for driving the same, and electrical control means operated by the aforesaid lever in its five different positions, whereby to operate the motor means for positioning in one direction in the first extreme position of the lever and in the reverse direction in the other extreme position of the lever for movement of said machine tool element in opposite directions in those extreme positions, and whereby to operate the motor means for locking in one direction in the locking position of the lever and in the reverse direction in either of the unlocking positions of the lever.

28. In a machine tool, the combination of a movable carriage, power operable positioning means for moving the carriage, power operable locking means for locking the carriage in different selected positions, motor means for operating the positioning and locking means, and means automatically controlling the application of power to said means so that the locking means is operable only after completion of the positioning operation of the positioning means, the motor means being arranged to stall at the limit of locking operation and being arranged to be automatically open circuited after stalling.

29. In a machine tool, the combination of a movable carriage arranged to be moved to different positions, a screw and nut for locking the carriage, a motor for causing relative rotation of the screw and nut, the motor being arranged to stall at the limit of locking operation and having an overload switch to open the circuit therefor after stalling, a rotatable gear arranged to turn with one of the screw and nut elements in either direction and providing the connection of said motor with the screw and nut, and means providing a lost motion driving connection between the gear and the element driven thereby, whereby to allow a certain amount of free turning of the motor in the reverse direction toward unlocking after stalling.

30. A locking mechanism for a machine tool element comprising relatively rotatable screw and nut elements, a reversible motor for causing relative rotation of said elements, the motor having a lost motion driving connection with one of said elements whereby to allow a certain amount of free turning of the motor in the reverse direction for unlocking, the motor being arranged to stall in the locking operation whereby to lock the machine tool element under a predetermined load on the screw and nut elements, an overload switch to open the motor circuit after stalling of the motor, and another switch normally closed during unlocking operation of the motor but opened by a predetermined amount of relative movement between the screw and nut elements, whereby to open the motor circuit when the machine tool element is unlocked.

31. In an automatic positioning and locking mechanism, the combination of a movable part to be positioned and locked, a propelling screw threaded therein to communicate movement thereto, an electric motor for driving the screw, a locking screw for locking said part by a threading action, an electric motor for driving the locking screw, both of said motors being included in electric circuits, the movable part being movable into engagement with an abutment, and circuit breaker means whereby the circuit for the first motor is broken in timed relation to the engagement of the part with the abutment whereby to insure firm engagement therebetween with the screw tightened a predetermined extent, and other circuit breaker means whereby the circuit for the second motor is broken in timed relation to the tightening of the locking screw whereby to insure tight locking with the screw tightened a predetermined extent.

32. In an automatic positioning and locking mechanism, the combination of a movable part to be positioned and locked in engagement with an abutment, screw threaded means for positioning said part, an electric motor for driving said means, a control therefor whereby to insure jamming of the screw threaded means when the part comes into engagement with the abutment, other screw threaded means for locking the part, an electric motor for driving said means, and a control therefor to also insure jamming of the last mentioned screw threaded means in the locking of the part.

33. In a machine tool, the combination of a movable carriage, positioning means for moving the carriage to a predetermined position, and locking means for locking the carriage in a selected position, the positioning and locking means being so related that the locking means renders the positioning means inoperative until the locking means is operated to unlocked position.

34. In combination, clamping means including a screw and nut, a motor for causing relative rotation of the screw and nut, the motor being arranged to stall at the limit of locking operation and having an overload switch to open the circuit therefor after stalling, a rotatable gear arranged to turn with one of the screw and nut elements in either direction and providing the connection of said motor with the screw and nut, and means providing a lost motion driving connection between the gear and the element driven thereby, whereby to allow a certain amount of free turning of the motor in the reverse direction toward unlocking after stalling.

35. A power operated clamping mechanism comprising relatively rotatable screw and nut elements, a reversible motor for causing relative rotation of said elements, the motor having a lost motion driving connection with one of said elements whereby to allow a certain amount of free turning of the motor in the reverse direction for unlocking, the motor being arranged to stall in the locking operation whereby to clamp under a predetermined load on the screw and nut elements, an overload switch to open the motor circuit after stalling of the motor, and another switch normally closed during unlocking operation of the motor but opened by a predetermined amount of relative movement between the screw and nut elements, whereby to open the motor circuit.

36. In a machine tool, the combination of a movable carriage, positioning means for making a selective setting and for moving the carriage to a predetermined position determined by said setting, locking means for automatically locking the carriage in said selected position, and means coordinating the positioning means and the locking means to automatically effect said locking in response to the setting and operation of said positioning means.

37. In a machine tool, the combination of a movable carriage, positioning means for making a selective setting and for moving the carriage to a predetermined position determined by said setting, locking means for automatically locking the carriage in said selected position, and electric controls coordinating the positioning means and the locking means to automatically effect said locking in response to the setting and operation of said positioning means.

38. In a machine tool, the combination of a movable carriage, positioning means for making a selective setting and for moving the carriage to a predetermined position determined by said setting, locking means for automatically locking the carriage in said selected position, and means coordinating the positioning means and the locking means arranged to prevent the automatic operation of the locking means until after the positioning means has moved the carriage to the selected position.

39. In a machine tool, the combination of a movable carriage, positioning means for moving the carriage to a predetermined position, locking means for locking the carriage in a selected position, and means rendering the positioning means inoperative to move the carriage until the locking means has been operated to unlock the carriage.

40. In a machine tool, the combination of a movable carriage, positioning means for moving the carriage to a predetermined position, locking means for locking the carriage in a selected position, and control mechanism for said positioning means and said locking means including means to prevent operation of the positioning means until after the locking means has been operated to unlock the carriage and including means for rendering the locking means inoperative so that the positioning means may be operated independently of the locking means.

41. In a machine tool, the combination of a movable carriage, locking means for locking and unlocking the carriage and normally maintaining the carriage locked, positioning means for moving the carriage to a predetermined position, and control mechanism for the locking means and the positioning means operable for unlocking the carriage and thereupon automatically operating the positioning means to move the carriage to a previously selected position.

42. In a machine tool, the combination of a movable carriage, locking means for locking and unlocking the carriage and normally maintaining the carriage locked, positioning means for moving the carriage to a predetermined position, and control mechanism for the locking means and the positioning means operable for unlocking the carriage and thereupon automatically operating the positioning means to move the carriage to a previously selected position, and for causing the locking means to automatically lock the carriage in said selected position.

43. In a machine tool, the combination of a movable carriage, locking means for locking and unlocking the carriage and normally maintaining the carriage locked, positioning means for moving the carriage to a predetermined position, and control mechanism for the locking means and the positioning means operable for unlocking the carriage and thereupon automatically operating the positioning means to move the carriage to a previously selected position, and for causing the locking means to automatically lock the carriage in said selected position, and including means for preventing operation of the positioning means until after the locking means has been operated to unlock the carriage.

44. In a machine tool, the combination of a movable carriage, positioning means adapted to be set for selecting a given position to which the carriage is to be moved and operable for automatically moving the carriage to said selected position, and locking means for automatically locking the carriage in said selected position acting in response to the setting and operation of the positioning means.

45. In a machine tool, the combination of a movable carriage, means normally locking the carriage against movement and operable to automatically unlock the carriage, positioning means adapted to be set for selecting a given position to which the carriage is to be moved, and means whereby the unlocking is automatically effected in response to the setting of the positioning means.

46. In a machine tool, the combination of a movable carriage, means normally locking the carriage against movement and operable to automatically unlock and lock the carriage, positioning means adapted to be set for selecting a given position to which the carriage is to be moved, and means coordinating the locking means and the positioning means to automatically unlock the carriage from its normally locked position, automatically move the carriage to the selected position, and automatically lock the carriage in said selected position.

CHARLES B. DE VLIEG.